United States Patent [19]
St. Aubyn Hubbard et al.

[11] Patent Number: 5,460,903
[45] Date of Patent: Oct. 24, 1995

[54] IONICALLY CONDUCTIVE POLYMER GELS

[75] Inventors: Hugh V. St. Aubyn Hubbard, Leeds; James E. McIntyre, Harrogate; Victor Rogers, Pudsey; Ian M. Ward, Leeds, all of England

[73] Assignee: British Technology Group Limited, London, England

[21] Appl. No.: 196,199

[22] PCT Filed: Sep. 29, 1992

[86] PCT No.: PCT/GB92/01781

§ 371 Date: Feb. 24, 1994

§ 102(e) Date: Feb. 24, 1994

[87] PCT Pub. No.: WO93/07626

PCT Pub. Date: Apr. 15, 1993

[30] Foreign Application Priority Data

Oct. 3, 1991 [GB] United Kingdom .................. 9121117

[51] Int. Cl.⁶ .................................................... H01M 6/18
[52] U.S. Cl. .......................... 429/190; 429/192; 429/194; 252/62.2; 252/500; 204/414; 204/421
[58] Field of Search ...................................... 429/190, 192, 429/194; 252/62.2, 500; 204/414, 421; 156/DIG. 108

[56] References Cited

U.S. PATENT DOCUMENTS

| | | | |
|---|---|---|---|
| 4,908,283 | 3/1990 | Takahashi et al. | 429/192 |
| 5,009,970 | 4/1991 | Kronfli et al. | 429/192 |
| 5,356,553 | 10/1994 | Kono et al. | 429/192 |

FOREIGN PATENT DOCUMENTS

| | | |
|---|---|---|
| 0301774 | 2/1989 | European Pat. Off. . |
| 61-046935 | 3/1986 | Japan . |
| 2212504A | 7/1989 | United Kingdom . |

OTHER PUBLICATIONS

G. Feuillade, P. H. Perche, "Ion–Conductive macromolecular gels . . . " Journal of Applied Electrochemistry, vol. 5, 1975, London, GB, pp. 63–69.

*Primary Examiner*—John Niebling
*Assistant Examiner*—Bruce F. Bell
*Attorney, Agent, or Firm*—Nixon & Vanderhye

[57] ABSTRACT

A bulk ionically conductive polymer gel is prepared by dissolving a salt such as lithium trifluoromethanesulphonate (which would provide lithium ion conductors) in an organic compound such as N-formylpiperidine. The organic compound dissolves the salt at 20° C. but is not a solvent at 20° C. (though it is at 215° C.) for polyethylene terephthalate. The last-named is a crystallizable polymer which is added in a minor amount at a high temperature to the other components and provides the required mechanical rigidity for the product at lower temperatures.

9 Claims, 1 Drawing Sheet

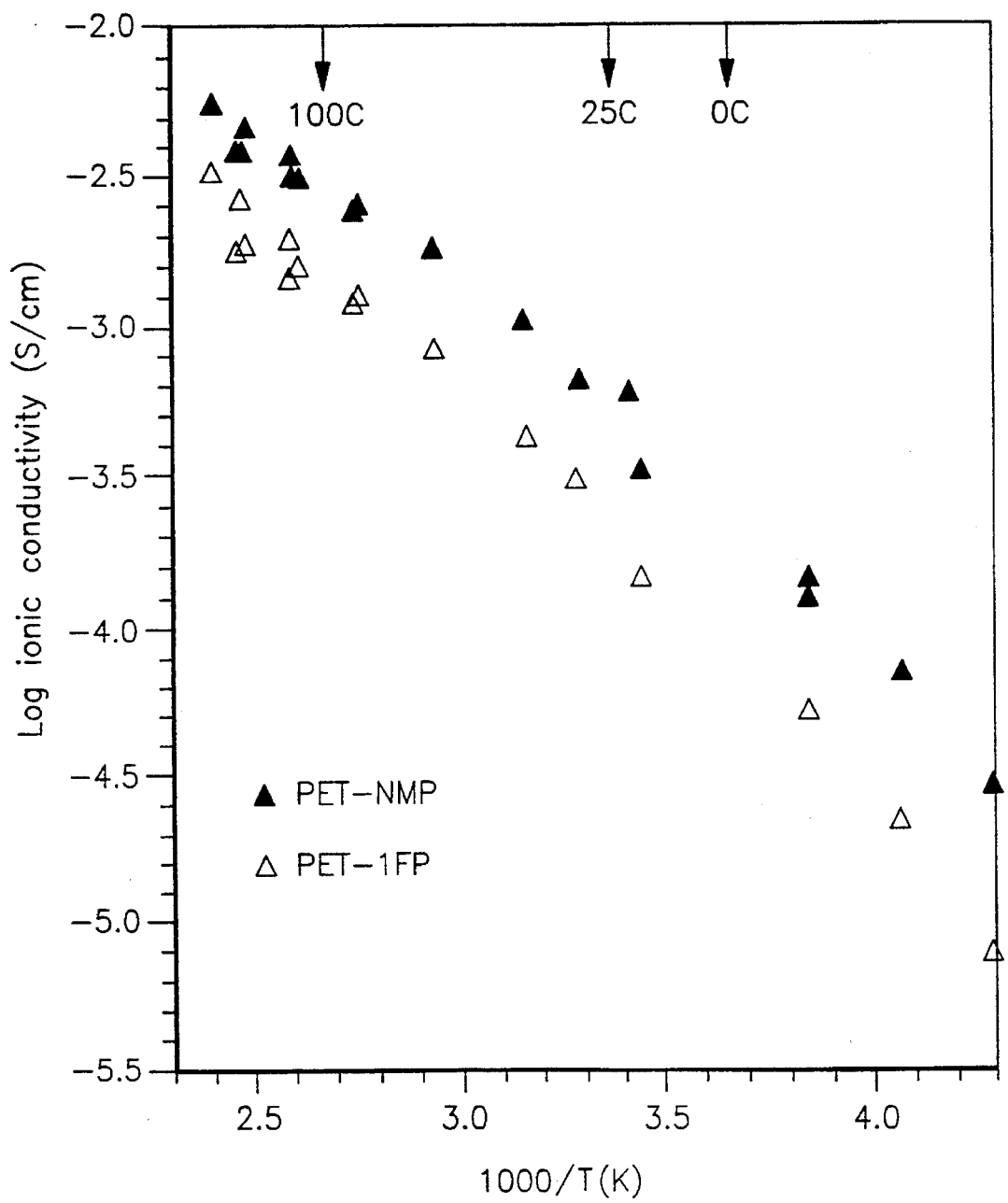

IONICALLY CONDUCTIVE POLYMER GELS

This invention relates to bulk ionically conductive polymer gels and their preparation, and to galvanic cells containing them.

BACKGROUND OF THE INVENTION

The most commonly used electrolytes are fluid liquids which comprise solutions in a liquid solvent of solute ionic species. Such fluid liquid electrolytes, on incorporation into a galvanic cell, permit migration of ions between the electrodes of the cell and, as a consequence, the provision of electric free energy to a closed external circuit. Despite their widespread use, such electrolytes nonetheless suffer from several disadvantages. Thus, they are often corrosive, leading to leakage from cells and they do not provide a firm barrier between the electrodes when required to assist in stabilizing the inter-electrode distance and in preventing physical loss of electrode material from the electrode surface.

In order, in part, to overcome the disadvantages inherent in fluid liquid electrolytes, particularly In relation to galvanic cells, considerable effort has been expended in attempts to provide solid or highly viscous polymeric electrolytes which contain salts which display mobility, under appropriate conditions, of at least some of the ionic species present. The solid polymeric electrolytes are capable of acting in thin film form as electrode separators and in solid-state cells can deform while maintaining good contact with the electrodes, thus minimizing problems arising from mechanical strain arising either from mechanical stresses during use or volume changes during the charge/discharge cycle. A particular area of importance is In cells that do not depend upon water as a component of the electrolyte, such as lithium cells where water and other materials capable of reacting with lithium are undesirable. The potential uses for such materials are not limited to batteries but include, inter alia, sensor devices and thermoelectric energy convectors.

A prominent polymeric material for this purpose has been poly(ethylene oxide) (PEO), In which certain salts are soluble and can form complexes. The electrical and mechanical properties of such polymer electrolyte materials, although encouraging, require further enhancement before commercialisation can be envisaged. Improvements in the properties have been obtained using graft copolymers in which short poly(ethylene oxide) chains are present as pendant units attached to a long main chain. Such materials have been described In GB-A-2161488. Another means of improving the mechanical properties is to use block copolymers in which short poly(ethylene oxide) chains alternate with other units such as polysiloxane. Yet another means is to cross-link a poly(ethylene oxide) with an epoxy compound. In each case the polymer electrolyte contains a suitable salt complexed with the polymer to provide the ionic species required for conductivity. In all these cases the conductivities reported at 25° C. or at room temperature are at best about $10^{-4}$ Siemens per cm. These values are an order of magnitude less than a commonly cited target for commercial realization of $10^{-3}$ Siemens per cm.

It is also possible to provide polymer electrolytes which consist of a mixture of a polymer, preferably of high molecular weight, with a compound of low molecular weight that is a solvent for the polymer in the range of temperatures in which the electrolyte is to be used, together with an appropriate salt that is soluble in the polymer and in the compound of low molecular weight. For example, as disclosed in GB-A-2212504 and 2216132, polymer electrolytes consisting of poly-N,N-dimethylacrylamide or closely related poly-N-substituted acrylamide of high molecular weight plasticized with dimethylacetamide together with lithium trifluoromethane sulphonate (lithium triflate) as the salt component have been evaluated and found to exhibit good conductivities together with good mechanical properties. These polymer electrolytes are gel-like in character, but the compound of low molecular weight must not exceed a certain limiting concentration above which the system loses its gel-like character and begins to flow. The ionic conductivity is higher at the higher concentrations of the compound of low molecular weight, but the material becomes increasingly more flexible. Conductivities of $7 \times 10^{-3} Scm^{-1}$ at 20° C. are obtainable but this requires at least 60% or more of the low molecular weight compound and at this level the mechanical properties are poor. It has proved possible by cross-linking the polymer to improve the mechanical properties to a useful level with as much as 80% of the low molecular weight compound present, and thus to obtain conductivities at 20° C. exceeding $10^{-3} Scm^{1}$. These products may prove of commercial interest, but the process for making the cross-linked polymer electrolyte film is somewhat complex for convenient incorporation into a process for cell manufacture.

DESCRIPTION OF THE INVENTION

This invention seeks to provide ionically conductive materials that provide high bulk ionic conductivities at ambient temperature together with good mechanical properties.

According to one aspect of the invention there is provided an ionically conductive, ion-containing gel having a bulk ionic conductivity at 20° and 10 kHz greater than $10^{-4}$ Siemens per centimeter and a dynamic modulus at 10 Hz greater than $10^3$ Pa, preferably greater than $10^4$ Pa, e.g. $>10^5$ Pa, wherein the gel consists of a minor amount of a crystallizable polymer such as a polyester, a major amount of an organic compound that is a solvent for a salt at 200° C. but is not a solvent for the crystallizable polymer at 20° C., and a salt dissolved in the organic compound at a concentration greater than 4% by mass based on the organic compound. The said minor amount is up to 50% by mass, preferably up to 40%, e.g. at least 5% such as at least 10%, typically 20–30%.

The ion-containing gels of this invention can provide better ionic conductivities both at ambient and elevated temperatures than polymer electrolytes based on polymer-salt complexes previously described and better mechanical properties than polymer electrolytes of good ionic conductivity based on polymer-salt-plasticizing solvent complexes previously described.

The ion-containing gels of this invention can normally be regarded as thermoreversible gels in which the junctions are physical associations, possibly corresponding with crystal structures comprising only a small portion of the polymer chains.

The crystallizable polymer may itself be capable of complexing with the salt through containing, for example, ether or amide groups, but it is not essential that the crystallizable polymer should dissolve or complex with the salt. This contrasts with previously described ion-conducting electrolyte systems based upon polymers where it has been essential that the polymer should dissolve or complex the salt and desirable that the polymer should be non-crystallizable.

Suitable crystallizable polymers for use in this invention include crystallizable polyesters such as poly(ethylene terephthalate), poly(1,4-butylene terephthalate) and poly(3-oxybutanoate), crystallizable polyamides such as poly(hexamethylene adipamide) and poly(m-phenylene isophthalamide), crystallizable polyethers and crystallizable substituted (e.g. halo) polyolefins such as substituted polyvinylidenes. Further examples include polyhydroxybutyric acid, poly(metaxylylene adipamide), poly(vinylidene fluoride), polyoxymethylene and polyoxyethylene. The crystallizable polymer is normally dissolved at a high temperature in the other components and can provide the required mechanical rigidity for the product at lower temperatures. If inadequate crystallizable polymer is present, the mechanical properties and dimensional stability will suffer. The crystallizable polymer is preferably of a sufficiently high molecular weight to form coherent films and fibres. In general, the higher the molecular weight of the polymer, the better the mechanical properties of the gel structure formed and the lower the concentration of the polymer required to maintain a gel structure, and the lower the concentration of polymer, the higher the conductivity.

Suitable organic compounds that are solvents for a salt at 20° C. but are not solvents for the crystallizable polymer at 20° C. include amides (preferably tertiary amides) which may be cyclic such as dimethyl formamide, dimethyl acetamide, N-methyl-2-pyrrolidinone and N-formyl piperidine, sulphoxides and ethers (preferably polyfunctional) such as the dimethyl ethers of diethylene glycol, triethylene glycol and tetraethylene glycol. Mixtures of such compounds may also be used. Where its more modest oxidation-reduction stability is adequate, the solvent organic compound may be dimethyl sulphoxide. It will be understood that these compounds do become solvents for the crystallizable polymer at some temperature above 20° C., e.g. above 100° C. or above 150° C. For use in batteries it is preferable that the organic compounds should be free from chemical groups that can react with electrode components. Thus for lithium batteries the organic compounds should not contain hydroxyl groups and should be as free of water as possible.

Suitable salts include alkali metal salts such as salts of lithium, sodium or potassium and substituted or unsubstituted ammonium. Lithium is particularly preferred because of the high solubility of many lithium salts in suitable organic compounds and the importance of lithium as an electrode material. The counterbalancing anion is preferably large and preferably a weak conjugate base. Examples include the monovalent anions derived from higher halogens and pseudohalogens, for example $Br^-$, $I^-$ and $SCN^-$ and complex inorganic, carboxylic and sulphonic, preferably perfluorinated alkyl carboxylic and sulphonic, monovalent anions, for example $ClO_4^-$, $HgI_3^-$, $BF_4^-$, $CF_3COO^-$, and $CF_3SO_3^-$. The concentration of salt based in the organic compound should be greater than 4% by weight and is limited at the upper end of the range by a saturation solubility of the salt In the organic compound in the presence of the polymer. The salt is preferably present in the gel structure at a concentration such that it does not exceed its saturation solubility throughout the proposed temperature range of use. Hence, for each combination of organic compound and salt and intended temperature there is an optimum concentration of salt for the highest conductivities to be obtained.

Gels according to this invention may be prepared by forming a solution of the polymer in the organic compound at above 20° C. (preferably above 100° C. such as above 150° C.), incorporating the salt into the solution either by addition after it has been formed or simultaneously or preferably by solution In the organic compound before the addition of the polymer, then cooling the solution. Such cooling will be understood to be to a temperature below the critical solution temperature of the polymer in the mixture of the organic compound and the salt.

The present invention also provides a galvanic cell wherein the electrolyte comprises an ionically conductive gel as herein defined; and a battery of such cells.

BRIEF DESCRIPTION OF THE DRAWING

The invention will now be described with reference to the accompanying drawing, in which:

FIG. 1 shows the results of a series of conductivity measurements carried out over a range of temperatures.

EXAMPLES

The following Examples illustrate the invention.
TEST METHODS
CELL PREPARATION AND MEASUREMENT OF IONIC CONDUCTIVITY Gel samples were re-heated until they melted and then cast on to a stainless steel (ion-blocking) electrode. A second stainless steel electrode was rapidly brought into contact with the gel so that the gel was sandwiched between the electrodes and good contact with both electrodes was achieved. The contact area A and electrolyte thickness t were accurately Known; in all cases A was 1.0 $cm^2$ and t was in the range 0.86–1.69 mm.

The prepared cell was then immediately transferred to the chamber in which the conductivity measurements were carried out, which was flooded with dry nitrogen to present exposure of the cell to the atmosphere. Brass plates were used to provide electrical contact with both electrodes. The temperature of the sample was controlled by passing the dry nitrogen over a heat exchanger before it entered the chamber; a thermocouple positioned near to the cell was used to monitor the temperature, which was controlled by a Eurotherm temperature control unit.

A Solartron 1250 frequency response analyser and latterly a Schlumberger 1260 impedance/gain-phase analyser were used to measure the complex admittance of the cell in the frequency range 0.1 Hz to 63 kHz. Due to the blocking nature of the electrodes, the real part of the admittance rose with frequency to a plateau. The bulk gel electrolyte resistance $R_b$ was calculated from the frequency-independent plateau observed in the real part of the admittance at frequencies above around 10 kHz. The ionic conductivity o was then calculated from the expression $$\alpha = \frac{1}{R_b} \times \frac{t}{A}$$

Measurement of Gel Modulus

Gel electrolytes were cast into discs of diameter 25 mm and thickness approximately 2 mm (±0.3 mm). These discs were placed between parallel circular disc platens of 25 mm diameter in a Rheometrics Dynamic Spectrometer RDS2, at ambient temperature (18° C. to 23° C.) in a nitrogen atmosphere, and squeezed under an axial load up to 1 kg to the measurement thickness H.

Two mechanical measurements were made:
1 ) Dynamic Modulus $G^1$

One of the disc platens oscillates sinusoidally about its cylindrical axis of symmetry with an applied shear strain amplitude. Shear strain is measured at the circumference, or maximum radius R, using the maximum sine wave (zero to peak) angular displacement θ, such that $$\text{Strain} = \frac{R\theta}{H}$$

The in-phase component of the measured sinusoidal shear stress is used to determine the dynamic modulus $G^1$. First, therefore, stress is obtained from the torque or couple measured at the opposite platen using the formula:

$$\text{Stress} = \frac{\text{torque} \times 2000 \times 98.07}{\pi \times R^3} \quad (\text{Pa})$$

(with torque in gram centimeters). Then $$G^1 = \frac{\text{stress} \times \cos\delta}{\text{strain}}$$

where δ is the phase lag between the stress and strain sine waves.

$G^1$ was measured for frequencies between 0.016 Hz and 79.6 Hz. Values of $G^1$ may increase slightly with frequency and are quoted for 1% shear strain and 10 Hz frequency.

2) Relaxation Modulus G<t)

Using the same geometry, a step shear strain of 1% is applied. The stress then decays from its maximum as a function of time.

$$\text{step strain} = \frac{R\phi}{H}$$

where φ is a fixed angular displacement.
The relaxation modulus is then given by $$G(t) = \frac{\text{Stress}}{\text{step strain}}$$

where stress is the same as above.
The modulus G(t) is stated for 1% strain after a relaxation time of 100 seconds.

EXAMPLE 1

PET-NMP

N-Methyl-2-pyrrolidinone (NMP) was dried over a molecular sieve. Lithium trifluoromethanesulphonate $CF_3SO_3Li$ (lithium triflate) was dried over phosphorous pentoxide for 48 h. Poly(ethylene terephthalate) (PET) chips, of intrinsic viscosity 0.96 dl/g (1% in dichloroacetic acid at 25° C.) were dried at 120° C. for 4 h under reduced pressure.

To 9.0 g of molecular-sieve-dried N-methyl-2-pyrrolidinone were added 1.0 g of dried poly(ethylene terephthalate) chips and 1.18 g dried lithium triflate, all in a dried glass sample tube. The tube was sealed and transferred to a silicone oil both at 200° C. The contents were stirred intermittently and heated until the chips dissolved completely, which occurred at a bath temperature of about 215° C. The solution was then allowed to cool to room temperature. During cooling, the solution ceased to flow and solidified to a gel.

The gel was reheated until it flowed and was then cast under dry conditions in liquid form on to one of the electrodes of the frequency response analyser system. It was sandwiched between the two electrodes and allowed to cool in situ to re-form the gel structure which was a flexible film with good recovery from deformation.

A series of conductivity measurements was carried out over a range of temperatures, and the results are shown graphically in FIG. 1. The conductivity at 25° C. was found to be $10^{-3.2}$ Siemens per centimeter.

EXAMPLE 2

PET-1FP

Example 1 was repeated using 1-formylpiperidine (1FP) instead of N-methyl-2-pyrrolidinone and 1.03 g of lithium triflate instead of 1.18 g. The conductivities over a range of temperature are shown graphically in FIG. 1. The conductivity at 25° C. was found to be $10^{-3.5}$ Siemens per centimeter.

Dynamic mechanical measurements were performed on several shaped samples prepared according to Examples 1 and 2 using both parallel plates and cone-and-plate sample holders. The samples were subject to an alternating shear strain and the resulting shear stress measured and correlated against the input strain. The measured shear moduli were generally independent of frequency over the range 0.1 to 500 rad/s and the shear relaxation modulus was determined to be about $10^3$ Pa. The dynamic modulus of all these samples was found to exceed $10^3$ Pa at 10 Hz.

The accompanying drawing shows the results from these two Examples on a log-conductivity/inverse temperature plot.

EXAMPLE 3-11

The general procedure adopted was as follows:
Dry lithium triflate was dissolved in the dry solvent at room temperature in a sealed dry flask using the molar proportion required of lithium triflate to solvent. A measured volume of the solution was added to a measured weight of the polymer in a dry vessel and the mixture was heated, with mechanical stirring, by means of an oil bath pre-set at a temperature above 150° C. sufficient to cause the polymer to dissolve. The vessel was sealed and quenched to room temperature to cause gel formation.

The conductivity and modulus measurements were made using the procedures already described.

The polymers used for these Examples (and for Examples 1 and were obtained as follows:

Poly(ethylene terephthalate) (PET) was a bottle-grade polymer of [n] 0.96, in pellet form.

Poly(vinylidene fluoride) (PVDF) was obtained from Polysciences Inc. in pellet form. It had a weight average molecular weight, according to the suppliers, of 100,000.

Polyhydroxybutyric acid (PHBA) was obtained from Aldrich in powder form. It had a weight average molecular weight, according to the suppliers, of 670,000.

Poly(metaxylylene adipamide) (MXD,6) was Mitsubishi Grade 6001.

Nylon 6,6 was obtained from ICI in the form of granules, Type R6600.

Polyoxymethylene was obtained from Aldrich in the form of beads.

Results of the conductivity and modulus measurements for Examples 3–11 are given in Table 1. In this Table the abbreviations are as follows:

| DMF | dimethyl formamide |
|---|---|
| DMSO | dimethyl sulphoxide |
| TGDME | tetraethylene glycol dimethyl ether |
| NMP | N-methyl pyrrolidinone |
| DMA | dimethyl acetamide |

The values of $G^1$ are measured at 1% strain amplitude and a frequency of 10 Hz. The values of $G(t)$ are measured 2 minutes after application of a strain of 1%. Both $G^1$ and $G(t)$ are measured at ambient temperature.

TABLE 1

| Example | Polymer | Solvent | Mass % Li triflate based on solvent | Polymer conc. wt % of total gel | Conductivity at 20° C. S cm$^{-1}$ | Dynamic modulus $G^1$(Pa) | Relaxation modulus G(t)Pa) |
|---|---|---|---|---|---|---|---|
| 3 | PVDF | DMF | 16.8 | 26.5 | $6.6 \times 10^{-3}$ | $3 \times 10^5$ | $2 \times 10^5$ |
| 4 | PVDF | DMSO | 18.3 | 23.8 | $4.6 \times 10^{-3}$ | $2 \times 10^5$ | $1 \times 10^5$ |
| 5 | PVDF | TGDME | 5.9 | 27.2 | $2.0 \times 10^{-4}$ | $1 \times 10^5$ | $7 \times 10^4$ |
| 6 | PET | NMP | 13.5 | 27.2 | $2.0 \times 10^{-3}$ | $2 \times 10^5$ | $1 \times 10^5$ |
| 7 | PHBA | DMA | 14.0 | 13.4 | $3.6 \times 10^{-3}$ | $3 \times 10^5$ | — |
| 8 | PHBA | DMA | 14.0 | 21.8 | $1.5 \times 10^{-3}$ | $1 \times 10^5$ | $7 \times 10^4$ |
| 9 | MXD,6 | NMP | 13.5 | 12.6 | $2.4 \times 10^{-3}$ | $2 \times 10^5$ | $1 \times 10^5$ |
| 10 | Nylon 6,6 | NMP | 13.5 | 7.9 | $2.2 \times 10^{-3}$ | $4 \times 10^4$ | — |
| 11 | POM | NMP | 13.5 | 20.5 | $2.9 \times 10^{-4}$ | $5 \times 10^4$ | $3 \times 10^4$ |

We claim:

1. An ionically conductive ion-containing gel having a bulk ionic conductivity at 20° C. and 10 kHz greater than $10^{-4}$ Siemens/cm and a dynamic modulus at 10 Hz greater than $10^3$ Pa, wherein the gel contains up to 50% by mass of a crystallizable polymer selected from the group consisting of poly(ethylene terephthalate), poly(1,4-butylene terephthalate), poly(3-oxybutanoate), polyhydroxybutyric acid, poly(hexamethylene adipamide), poly(metaxylylene adipamide), poly(m-phenylene isophthalamide), poly(vinylidene fluoride), polyoxymethylene and polyoxyethylene, over 50% by mass of an organic compound that is not a solvent for the crystallizable polymer at 20° C., said compound being selected from the group consisting of dimethyl formamide, dimethyl acetamide, N-methyl-2-pyrrolidinone, N-formyl piperidine, a dimethyl ether of diethylene glycol, triethylene glycol or tetraethylene glycol, and dimethyl sulphoxide and a lithium salt with an anion selected from the group consisting of Br$^-$, I$^-$, a pseudohalogen and a perfluorinated alkyl carboxylate or sulphonate, said salt being soluble in the said compound at 20° C. and dissolved therein at a concentration greater than 4% by mass based on said compound.

2. A gel according to claim 1, whose dynamic modulus at 10 Hz exceeds $10^4$ Pa.

3. A gel according to claim 2, whose dynamic modulus at 10 Hz exceeds $10^5$ Pa.

4. A method of making a gel as defined in claim 1, comprising forming a solution of the polymer in the organic compound at above 20° C., incorporating the salt beforehand, simultaneously or afterwards, and cooling the solution.

5. A method according to claim 4, wherein said solution is formed at above 100° C.

6. A method according to claim 5, wherein said solution is formed at above 150° C.

7. A galvanic cell wherein an electrolyte comprises a gel made by the method of claim 4.

8. A galvanic cell wherein an electrolyte comprises a gel according to claim 1.

9. A gel according to claim 1, wherein said anion is selected from the group consisting of SCN$^-$, ClO$_4^-$, HgI$_3^-$, BF$_4^-$, CF$_3$COO$^-$ and CF$_3$SO$_3^-$.

* * * * *